(12) United States Patent
Hayakawa (10) Patent No.: US 10,673,371 B2
(45) Date of Patent: Jun. 2, 2020

(54) MOTOR CONTROL DEVICE

(71) Applicant: DENSO CORPORATION, Kariya, Aichi-pref. (JP)

(72) Inventor: Tomoharu Hayakawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/083,132

(22) PCT Filed: Feb. 1, 2017

(86) PCT No.: PCT/JP2017/003502
§ 371 (c)(1),
(2) Date: Sep. 7, 2018

(87) PCT Pub. No.: WO2017/159091
PCT Pub. Date: Sep. 21, 2017

(65) Prior Publication Data
US 2019/0097565 A1 Mar. 28, 2019

(30) Foreign Application Priority Data
Mar. 17, 2016 (JP) ................................. 2016-053615

(51) Int. Cl.
*H02P 29/028* (2016.01)
*H02P 25/22* (2006.01)
(Continued)

(52) U.S. Cl.
CPC ............. *H02P 29/028* (2013.01); *B62D 5/04* (2013.01); *B62D 5/0463* (2013.01); *H02P 6/085* (2013.01);
(Continued)

(58) Field of Classification Search
CPC ..... H01L 2924/000014; H01L 2924/00; H01L 2224/48091; H01L 2924/1305; H01L 2924/30107
See application file for complete search history.

(56) References Cited

U.S. PATENT DOCUMENTS

2014/0009093 A1   1/2014   Suzuki
2014/0084836 A1*  3/2014   Pham ................... F25B 49/022
                                              318/490
(Continued)

FOREIGN PATENT DOCUMENTS

JP    2003-32805 A    1/2003
JP    2004-80939 A    3/2004
(Continued)

*Primary Examiner* — Bickey Dhakal
*Assistant Examiner* — Zoheb S Imtiaz
(74) *Attorney, Agent, or Firm* — Knobbe, Martens, Olson & Bear, LLP (57) ABSTRACT

A motor control device is provided. In this motor control device, a first switching circuit group and a second switching circuit respectively provided between first and second microcomputers and first and second power converters receive drive signals generated by the microcomputers included in the own system and other drive signals generated by a microcomputer other than the microcomputers of the own system, select the own drive signal or the other drive signal according to selection signal from the microcomputers of the own system, and output the selected drive signal to the power converter of the own system. The first and second microcomputers output the selection signals to the switching circuit groups of the own system so as to select the own drive signal when the microcomputers are operating normally, and output the selection signal so as to select the other drive signal when a monitoring circuit of the system detects an faulty in the microcomputers.

2 Claims, 8 Drawing Sheets

(51) Int. Cl.
*B62D 5/04* (2006.01)
*H02P 27/06* (2006.01)
*H02P 29/032* (2016.01)
*H02P 6/08* (2016.01)

(52) U.S. Cl.
CPC .............. *H02P 25/22* (2013.01); *H02P 27/06* (2013.01); *H02P 29/032* (2016.02); *B62D 5/0412* (2013.01)

(56) References Cited

U.S. PATENT DOCUMENTS

| | | | |
|---|---|---|---|
| 2018/0208236 A1* | 7/2018 | Asao | B62D 6/08 |
| 2019/0028053 A1* | 1/2019 | Akutsu | B62D 5/0496 |

FOREIGN PATENT DOCUMENTS

| | | |
|---|---|---|
| JP | 2013-255358 A | 12/2013 |
| JP | 2014-138494 A | 7/2014 |
| JP | 5760830 B2 | 8/2015 |
| WO | 2017/059090 A1 | 9/2017 |
| WO | 2017/159089 A1 | 9/2017 |
| WO | WO 2017/159090 A1 | 9/2017 |

* cited by examiner

MOTOR CONTROL DEVICE

CROSS REFERENCE TO RELATED APPLICATION

The present application is based on Japanese Patent Application No. 2016-53615 filed on Mar. 17, 2016, disclosure of which is incorporated herein by reference.

TECHNICAL FIELD

The present disclosure relates to a motor control device that controls drive of a motor having a plurality of winding sets.

BACKGROUND ART

Conventionally, in a motor drive system, a plurality of components, each of which includes a winding set of a motor and a power converter for supplying power to a winding set are redundantly provided, and when one component fails, the motor is continuously driven by other normal component. Particularly, in a device related to main functions of a vehicle, improvement of reliability by redundancy is required for all assumed failures.

Hereinafter, the unit of a group of component for controlling energization to a specific winding set is defined as "system". Conventionally, a motor control device configured to supply electric power from two systems of power converters to two pairs of winding sets of the motor is often used.

Further, in a field different from the motor control device, a apparatus in which signal transmission units are redundant is known. For example, the transmission apparatus disclosed in Patent Document 1 includes a working unit and a spare unit which commonly have a transmission function of a work data, and a switching control unit for switching a transmission path. When an alarm generates in the working unit, the spare unit functions in place of the working unit.

PRIOR ART LITERATURES

Patent Document 1: Japanese Patent Publication H07-86988A

SUMMARY OF INVENTION

In order to cope with a failure of the microcomputer, a motor control device in which two microcomputers and two inverters are provided, and the drive signal generated by each microcomputer is output to a corresponding electric power converter, is considered. In such a motor control device, when any one of the microcomputers malfunctions, the operation of the power converter in the system including the faulty microcomputer is stopped. Then, if the microcomputer in one system of the two systems fails, it is possible to continue control with the remaining one microcomputer. There are some problems regarding an output torque suddenly changes at the time of switching from the two-system drive to the one-system drive, and discontinuity of operation. For example, in the drive system of a steering assist motor of an electric power steering apparatus, there is a fear that the driver feels discomfort.

It is therefore an object of the present disclosure to provide a motor control device that appropriately continues motor drive when any one of the microcomputers fails, regarding the motor control device in which a plurality of microcomputers are redundantly provided.

A motor control device according to one aspect of the present disclosure relates to a motor control device that controls drive of a motor having a plurality of winding sets.

Firstly, a unit of a group of components for controlling energization to a specific winding group is defined as "system". With respect to a certain component, a system including the certain component is defined as "own system", and the other system other than the own system is defined as "other system".

In a motor control device according to one aspect of the present disclosure, at least two systems in the plurality of systems includes a first power converter and a second power converter, a first microcomputer and a second microcomputer, a first monitoring circuit and a second monitoring circuit, and a first switching circuit group and a second switching circuit group.

The first power converter and the second power converter supply power to the corresponding winding sets based on an operation of a plurality of switching elements.

The first microcomputer and the second microcomputer, in a normal state, generate a drive signal for driving at least the power converter in the own system. The first monitoring circuit and the second monitoring circuit respectively monitor an abnormality of the first microcomputer and the second microcomputer.

The first switching circuit group is provided between the first microcomputer and the first electric power converter, and the second switching circuit group is provided between the second microcomputer and the second electric power converter, and the first switching circuit group and the second switching circuit group include a plurality of switching circuits correspond to a plurality of switching elements of the electric power converter.

The first switching circuit group and the second switching circuit group receive "own drive signal generated by the microcomputer in the own system" and "other drive signal generated by the microcomputer other than the microcomputer in the own system", and select one of the own drive signal or the other drive signal according to a selection signal from the microcomputer in the own system, and output it to the power converter in the own system.

The first microcomputer and the second microcomputer output a selection signal to the switching circuit group in the own system so as to select the own drive signal when the microcomputers are normal. When an abnormality of the microcomputers is detected by the monitoring circuit in the own system, a selection signal is outputted so as to select the other drive signal.

Thereby, when one of the microcomputers in two systems falls, the switching circuit group in a failed system selects the other drive signal so that the motor drive by the power converters in both systems can be properly continued. Therefore, particularly in the drive control of the steering assist motor of the electric power steering apparatus, sudden change of an output torque or the like can be avoided, and it is possible to prevent the driver from feeling strangeness.

The plurality of switching circuits constituting the first switching circuit group and the second switching circuit group may have a main switch and a sub switch.

The main switch may be turned on when a signal exceeding a predetermined voltage threshold value is input as a selection signal, and may be operated so that the own drive signal is output.

The sub switch may be turned on when a signal of a high impedance state, which is less than a predetermined voltage threshold value as a selection signal, is input, and may be operated so that other drive signal is output.

The first microcomputer and the second microcomputer may output a selection signal so that the main switch is turned on when the microcomputer is normal. When the abnormality of the microcomputer is detected by the monitoring circuit in the own system, the selection signal may be output so that the sub switch is turned on.

Regarding control switching in an abnormal state of the microcomputer, in the well-known technology in which two microcomputers mutually monitor abnormality, the configuration of control switching becomes complicated and a time lag occurs in switching.

On the other hand, according to one embodiment of the present disclosure, since the signal in the high impedance state is output as the selection signal when the microcomputer fails, the configuration of the control switching is simplified and quick switching can be performed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, a plurality of embodiments regarding the motor control device will be described based on the drawings. In each embodiment, ECU as "motor control device" is applied to an electric power steering apparatus, and controls an energization of the motor for generating a steering assist torque. In a plurality of embodiments below, substantially the same configurations will be denoted with the same reference sign, and the repeated description thereof will be omitted.

[Configuration of Electric Power Steering Apparatus]

Figure 2:
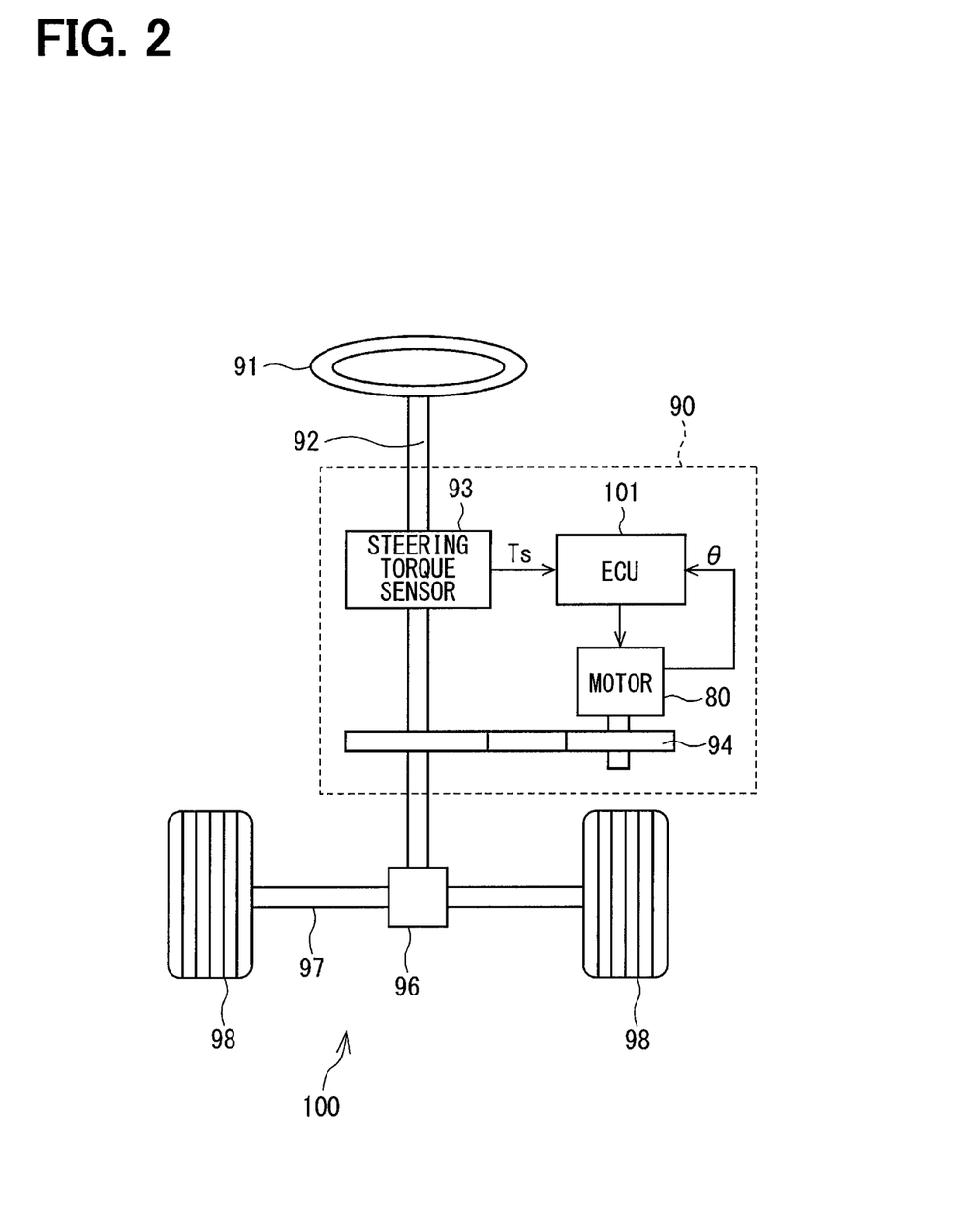
FIG. 2 is a diagram illustrating a schematic view of an electric power steering apparatus to which the ECU in each embodiment is applied.

FIG. 2 shows an overall configuration of a steering system 100 provided with the electric power steering apparatus 90. The electric power steering apparatus 90 shown in FIG. 2 is of a so-called "column assist type", but may be of a so-called "rack assist type".

The steering system 100 includes a steering wheel 91, a steering shaft 92, a pinion gear 96, a rack shaft 97, wheels 98, the electric power steering apparatus 90, and the like.

The steering wheel 91 is connected with the steering shaft 92. The pinion gear 96 is provided at the tip of the steering shaft 92. The pinion gear 96 is meshed with the rack shaft 97. A pair of wheels 98 is coupled to both ends of the rack shaft 97 through tie rods or the like. When the driver rotates the steering wheel 91, the steering shaft 92 connected to the steering wheel 91 rotates. The rotational motion of the steering shaft 92 is converted to linear motion of the rack shaft 97 by the pinion gear 96. The pair of wheels 98 is steered at an angle in accordance with a displacement amount of the rack shaft 97.

The electric power steering apparatus 90 includes a steering torque sensor 93, an ECU 101, a motor 80, a reduction gear 94, and the like. In an explanation regarding the ECU common to each embodiment, a symbol "101" of the ECU in the first embodiment is described as a representative.

The steering torque sensor 93 is provided on the steering shaft 92, and detects a steering torque Ts of the driver. The ECU 101 controls the drive of the motor 80 in such a manner that the motor 80 outputs a predetermined assist torque based on the steering torque Ts. The assist torque outputted by the motor is transmitted to the steering shaft 92 through the reduction gear 94.

Figure 1:
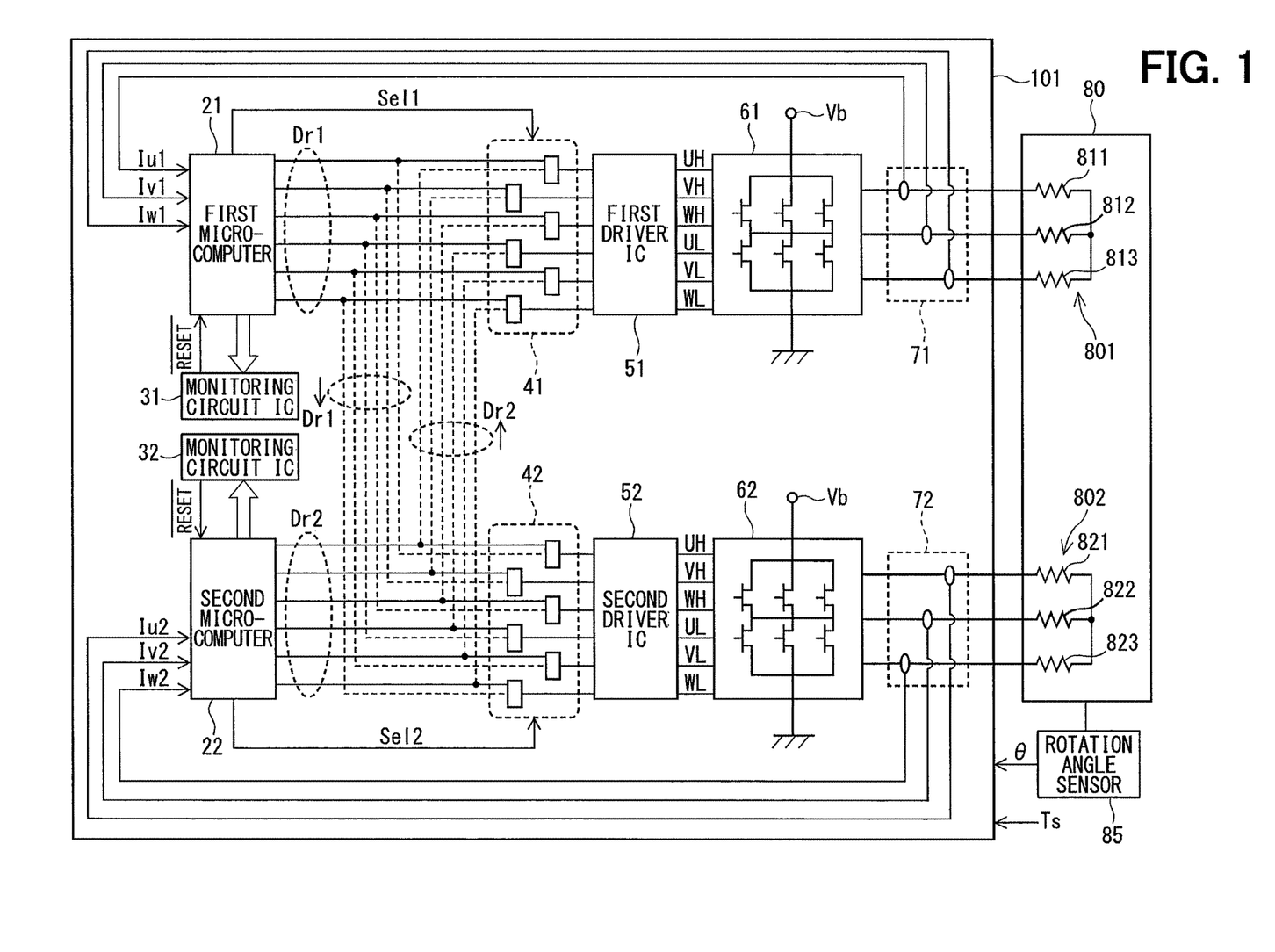
FIG. 1 is a diagram of an ECU (motor control device) in a first embodiment.

As shown in FIG. 1, the motor 80 to be controlled by the ECU 101 is a three-phase brushless motor having redundantly two pairs of three-phase winding sets 801, 802. The first winding set 801 includes an U-phase winding 811, a V-phase winding 812, and a W-phase winding 813, and the second winding set 802 includes an U-phase winding 821, a V-phase winding 822, a W-phase winding 823.

The winding sets 801, 802 have the same electrical characteristics, and are arranged to be shifted from each other by an electrical angle of 30 degrees to a common stator, as shown in FIG. 3 of Japanese Patent No. 5672278, for example. Correspondingly, the winding sets 801, 802 are controlled so that, for example, phase currents having equal amplitudes and phases shifted by 30 degrees are supplied.

[Configuration of ECU]

The ECU 101 acquires an electrical angle θ (Theta) of the motor 80 detected by a rotation angle sensor 85 and the steering torque Ts detected by the steering torque sensor 93. The ECU 101 controls the drive of the motor 80 by controlling energization from the inverters 61 and 62 to the winding sets 801, 802 based on the information of the electrical angle and the steering torque and the information of the phase current detected inside the ECU 101. The Drive of the motor 80 by driving both inverters 61, 62 and energizing both winding sets 801, 802 is referred to as "two systems drive". Further, the drive of the motor 80 by driving one of the inverters and energizing the corresponding one winding group is referred to as "one system drive".

Conventionally, in the ECU having such a configuration, in a normal state, the motor 80 is driven by two systems, and when one of the inverters 61, 62 or the winding sets 801, 802 malfunctions, the motor 80 is driven so as to be operated by a normal one system. This makes it possible to continuously keep the steering assist function of the electric power steering apparatus 90 even in the case of failure of one system.

Meanwhile, when the microcomputer malfunctions, for example, the control is stopped by outputting a reset signal when an external monitoring IC detects an abnormality of the microcomputer. This measurement is based on the idea of preventing steering control and steering lock contrary to the intention of the driver. However, stopping the drive of the steering assist motor to bring it into a so-called "heavy steering" state is disadvantageous depending on situations. Also, in recent years, in an automatic driving system that highly supports drivers, control continuation is required as much as possible.

In light of such a background, the present embodiment has a purpose to continue properly the drive control of the motor 80 in the ECU 101 that controls the drive of the motor 80 having the two pairs of winding sets 801, 802, even when the microcomputer falls.

Hereinafter, the configuration of the ECU of each embodiment will be described in each embodiment.

First Embodiment

The first embodiment will be described with reference to FIG. 1 and FIGS. 3 to 5.

As shown in FIG. 1, in principle, the ECU 101 of the first embodiment includes a first system for controlling the energization of the first winding set 801 and a second system for controlling the energization of the second winding set 802, and namely the system is composed of two systems. Here, "in principle" means that exceptionally the energization of the second winding group 802 is controlled by the microcomputer 21 of the first system and the energization of the second winding group 802 is controlled by the microcomputer 22 of the second system. These exceptional operations will be described later.

As to the names of the components of the ECU 101, "1st" is prefixed to the components of the 1st system as appropriate, "2nd" is prefixed to the components of the 2nd system to distinguish them.

Regarding the signs of the respective components of the ECU 101, "1" is attached to the second digit for the components of the first system and "2" to the second digit for the components of the second system. Also, "1" is appended to the signal symbol related to the first system, and "2" is added to the signal symbol related to the second system to distinguish them.

The ECU 101 includes a first microcomputer 21, a first monitoring circuit 31, a first switching circuit group 41, a first driver IC 51, a first inverter 61, and a current sensor 71 as a configuration of a first system. In addition, the ECU 101 includes a second microcomputer 22, a second monitoring circuit 32, a second switching circuit group 42, a second driver IC 52, a second inverter 62, and a current sensor 72 as a configuration of a second system. The first inverter 61 and the second inverter 62 correspond to a first power converter and a second power converter.

Since the configuration of the respective system are substantially same, the first system will be mainly described, and redundant explanation will be omitted as appropriate for the second system. Also, with respect to the noteworthy component, the system including the certain component is referred to as "own system", and the other system not including the certain component is referred to as "other system".

Although the electrical angle θ (theta) and the steering torque Ts are input to the first microcomputer 21 and the second microcomputer 22 of the ECU 101, illustration of these signal inputs is omitted. In addition, the first microcomputer 21 receives the phase currents Iu1, Iv1, Iw1 of the first system which is fed back from the first current sensor 71. The second microcomputer 22 receives the phase currents Iu2, Iv2, Iw2 of the second system which is fed back from the second current sensor 72.

In FIG. 1, the current sensors 71, 72 collectively show current sensors of respective phases for each system. The current sensors 71, 72 are not limited to the configuration provided on the power path from the inverters 61, 62 to the winding sets 801, 802, but may be provided as a shunt resistor between the lower arm switching elements of the inverters 61, 62 and the ground. Also, it is possible to detect only two phase currents out of the three phase currents and calculate the current of one phase based on Klrchhoff's law.

Based on the information, the microcomputers 21, 22 generate drive signals for driving the inverters 61, 62 of the respective system so that the motor 80 outputs the desired assist torque. It is preferable that the microcomputers 21, 22 operate synchronously.

In general vector control in three phase AC motor control, the electrical angle θ (Theta) is used for coordinate conversion between a fixed coordinate system and a rotating coordinate system. In the configuration in which the winding sets 801, 802 are shifted by 30 degrees, the electrical angle θ (Theta) is used in the first system and in the second system, for example, the electrical angle (θ+30) degrees is used for coordinate conversion.

Further, the microcomputers 21, 22 generate drive signals by, for example, PWM modulating the three-phase voltage commands. Techniques such as current feedback control, vector control, PWM control, etc. are well-known, so detailed description will be omitted.

With respect to the drive signal generated by the microcomputers 21, 22, in principle, a signal generated for driving the first inverter 61 is referred to as a "first drive signal Dr1", and a signal generated for driving the second inverter 62 is referred to as "second drive signal Dr2". Again, "in principle" means that there are exceptions.

In the first embodiment, the first microcomputer 21 generates the first drive signal Dr1, and outputs it to the first switching circuit group 41 of the own system, and also outputs it to the second switching circuit group 42 of the other system. The second microcomputer 22 generates the second drive signal Dr2, and outputs it to the second switching circuit group 42 of the own system, and also outputs it to the first switching circuit group 41 of the other system. In FIG. 1, the area enclosed by the ellipse indicated by the broken line means that the six lines written in the ellipse constitute the first drive signal Dr1 or the second drive signal Dr2.

In addition, the first microcomputer 21 and the second microcomputer 22 commonly output the first selection signal Sel 1 and the second selection signal Sel 2 to the switching circuit groups 41, 42 of the own system, respectively.

The first switching circuit group 41 and the second switching circuit group 42 are provided in the path of the drive signals Dr1, Dr2 from the microcomputers 21, 22 to the driver ICs 51, 52. The first switching circuit group 41 and the second switching circuit group 42 select one of the first drive signal Dr1 or the second drive signal Dr2 in accordance with the selection signals Sel1, Sel2 from the microcomputers 21, 22 of the own system, and output them to the driver ICs 51, 52 in the own system.

The first monitoring circuit 31 and the second monitoring circuit 32 individually monitor abnormality of the first microcomputer 21 and the second microcomputer 22, respectively. Any technique such as watchdog monitoring, arithmetic operation monitoring, clock monitoring, etc. may be used as a method of abnormality monitoring. The activation timing of the first monitoring circuit 31 and the second monitoring circuit 32 are synchronized.

When the first monitoring circuit 31 detects an abnormality of the first microcomputer 21, the first monitoring circuit 31 outputs a reset signal to the first microcomputer 21. When the second monitoring circuit 32 detects an abnormality of the second microcomputer 22, the second monitoring circuit 32 outputs a reset signal to the second microcomputer 22. In FIG. 1, a signal obtained by subtracting a horizontal bar on the character "RESET" means an inverted signal of the reset signal.

The microcomputers 21, 22 stop the control when the reset signal is input. As a result, the selection signals Sel1, Sel2 output to the switching circuit groups 41, 42 are in the high impedance state.

Figure 3:
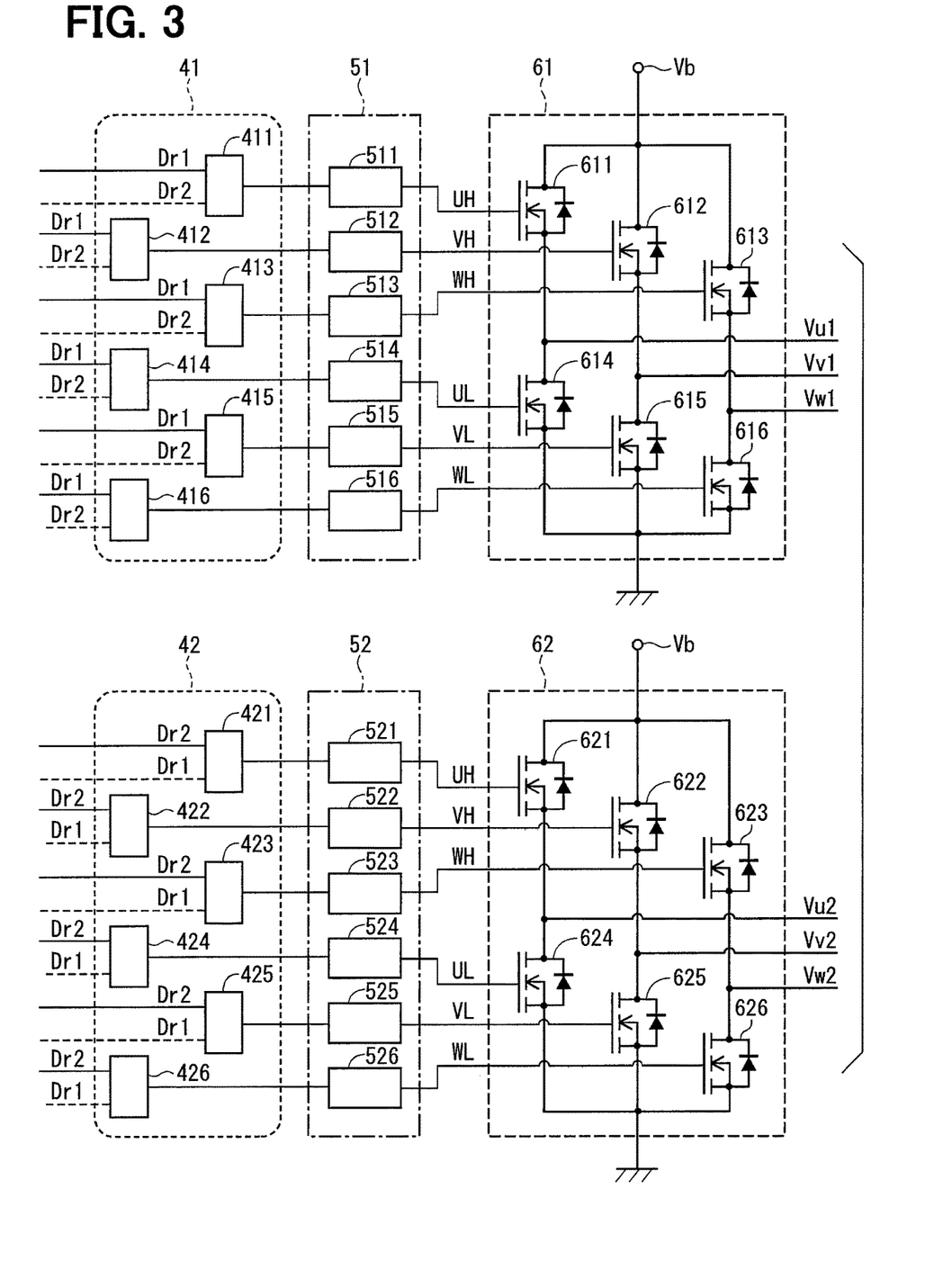
FIG. 3 is a detail diagram of a switching circuit group, a driver IC, and an inverter in FIG. 1.

FIG. 3 shows detailed configurations of the switching circuit groups 41, 42, the driver ICs 51, 52, and the inverters 61, 62. Hereinafter, the configuration of the first system will be described.

In the first inverter 61, six switching elements 611 to 616 are bridge-connected. The switching elements 611, 612, 613 are respectively U-phase, V-phase, and W-phase upper arm switching elements, and the switching elements 614, 615, 616 are respectively U-phase, V-phase, and W-phase lower arm switching elements. As for the switching elements 611 to 616, for example, MOSFETs are used. A field effect transistor, an IGBT, or the like other than the MOSFET may be used as the switching element.

The first inverter 61 converts the DC power of the power supply voltage Vb input from the battery (not shown) into AC power of the three-phase AC voltages Vu1, Vv1, Vw1 by the operation of the switching elements 611 to 616, and supplies them to the first winding set 801.

The first driver IC 51 has driver circuits 511 to 516 corresponding to the respective switching elements 611 to 616. Each driver circuit 511 to 516 outputs drive signals UH, VH, WH, UL, VL, WL to each switching element 611 to 616. By switching on and off each switching element 611 to 616 according to the drive signals UH, VH, WH, UL, VL, WL, desired three-phase AC voltages Vu1, Vv1, Vw1 are generated.

The bundle of the drive signals UH, VH, WH, UL, VL, WL for each of the switching elements 611 to 616 is referred to as a first drive signal Dr1 or a second drive signal Dr2 in this specification.

Each of the switching circuits 411 to 416 of the first switching circuit group 41 selects either the first drive signal Dr1 input from the first microcomputer 21 or the second drive signal Dr2 Input from the second microcomputer 22, and outputs it to the driver circuits 511 to 516 corresponding to the first driver IC 51. Hereinafter, "output to the driver circuits 511 to 516 corresponding to the first driver IC 51" is omitted and "output to the first driver IC 51" is referred to.

Similarly, in the second system, the second inverter 62 converts the power voltage Vb into the three-phase AC voltages Vu2, Vv2, and Vw2 by the operation of the switching elements 621 to 626, and applies them to the second winding group 802. The second driver IC 52 has driver circuits 521 to 526 corresponding to the respective switching elements 621 to 626. Each of the switching circuits 421 to 426 of the second switching circuit group 42 outputs the selected drive signal Dr1 or Dr2 to the driver circuit 521 to 526 corresponding to the second driver IC 52.

When the first switching circuit group 41 selects the first drive signal Dr1, the first inverter 61 is driven by the drive signal generated by the first microcomputer 21 of the own system. In this specification, the fact that the drive signals of the inverters 61, 62 are generated by the microcomputer of the own system is referred to as "generate with own", and the drive signal which is generated with own is referred to as "own drive signal".

On the other hand, when the first switching circuit group 41 selects the second drive signal Dr2, the first inverter 61 is driven by the drive signal generated by the second microcomputer 22 of the other system. In this specification, the fact that the drive signals of the inverters 61, 62 are generated by the microcomputer other than the microcomputer of the own system is referred to as "generate with other", and the drive signal which is generated with other is referred to as "other drive signal". In FIG. 1, the other drive signal is indicated by a broken line.

In the first embodiment, the microcomputer of the other system corresponds to the "microcomputer other than the microcomputer in the own system". On the other hand, in the third embodiment to be described later, the backup microcomputer corresponds to "a microcomputer other than the microcomputer in the own system".

In the manufacture Industry, in general, for "tangible products", "in-house/outside manufacture" is used. However, since the characters "manufacture" are not suitable for intangible signal generation, in the present specification, "generate with own" and "generate with other" are used.

Using this terminology, in the first embodiment, "the first microcomputer and the second microcomputer commonly output the own drive signal which is outputted to the switching circuit groups 41, 42 of the own system to the switching circuit group of the other system as the other drive signal" is able to express.

Further, the drive signals Input to the switching circuit groups 41, 42 are expressed as follows.

The first switching circuit group 41 receives the first drive signal Dr1 generated with own by the first microcomputer 21 of the own system and the second drive signal Dr2 generated with other by the second microcomputer 22 of the other system.

The second switching circuit group 42 receives the second drive signal Dr2 generated with own by the second microcomputer 22 of its own system and the first drive signal Dr1 generated with other by the first microcomputer 21 of the other system.

Figure 4:
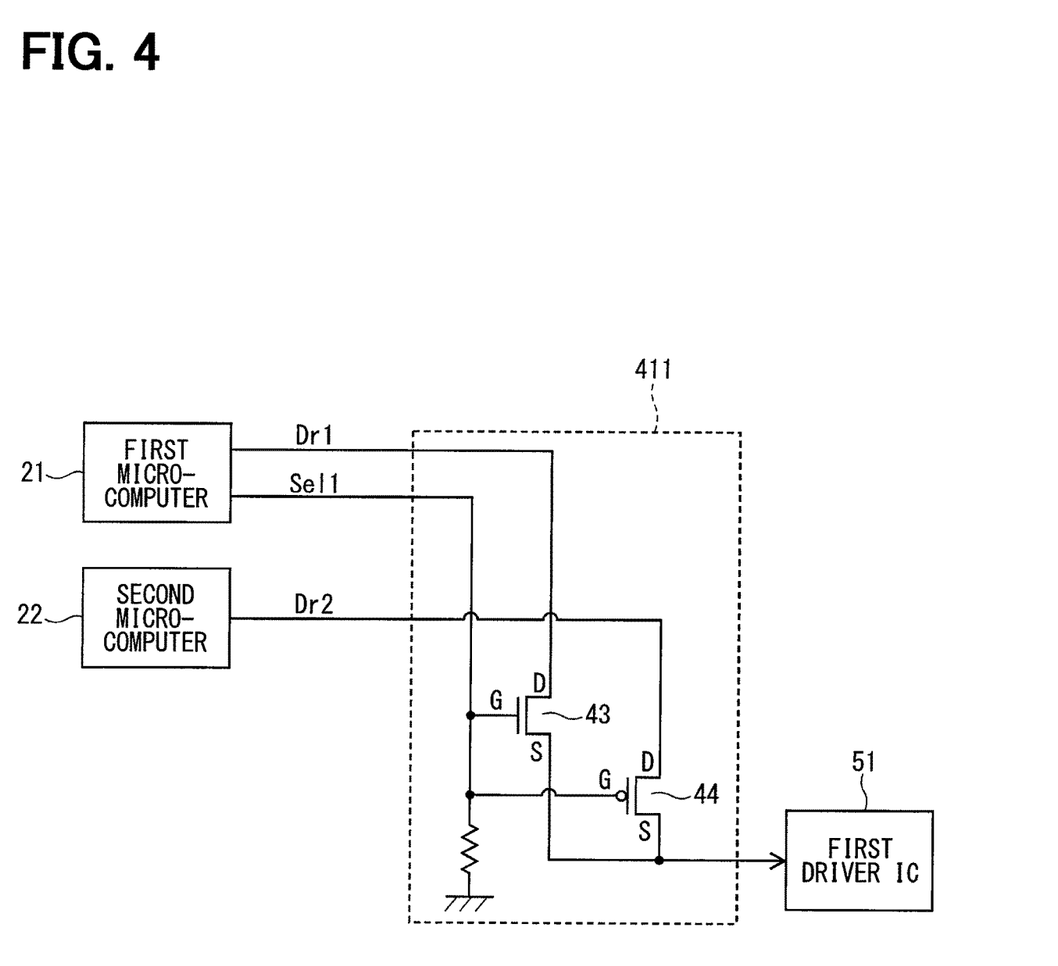
FIG. 4 is a diagram of the switching circuit common to the embodiments.

Next, with reference to FIG. 4, in the configuration of each switching circuit, the switching circuit 411 of the first switching circuit group 41 corresponding to the switching element 611 of the first system U-phase upper arm is described as a representative example. The configuration of the other switching circuits 412 to 416 of the first switching circuit group 41 is the same as that of the switching circuit 411. In addition, the configuration of each of the switching circuits 421 to 426 of the second switching circuit group 42 is obtained by replacing "first" and "second" in FIG. 4.

The switching circuit 411 includes a main switch 43 and a sub switch 44 which are configured by FET or the like.

The first drive signal Dr1 from the first microcomputer 21 is input to a drain of the main switch 43. The second drive signal Dr2 from the second microcomputer 22 is Input to a drain of the sub switch 44. Each of sources of the main switch 43 and the sub switch 44 is connected to the first driver IC 51.

The first select signal Sel1 is input to the gate of the main switch 43, and the inverted signal of the first selection signal Sel1 is Input to the gate of the sub switch 44. The main switch 43 and the sub switch 44 are turned on when the gate voltage exceeds a predetermined voltage threshold Vth. The voltage threshold value Vth is shown as a value slightly lower than the high value H of the first selection signal Sel1 in FIG. 5 (b).

Next, the operation of the ECU 101 will be described with reference to FIGS. 4 and 5. The time chart of FIG. 5 shows the transition of various signals when the first microcomputer 21 fails at time tx.

Figure 5:
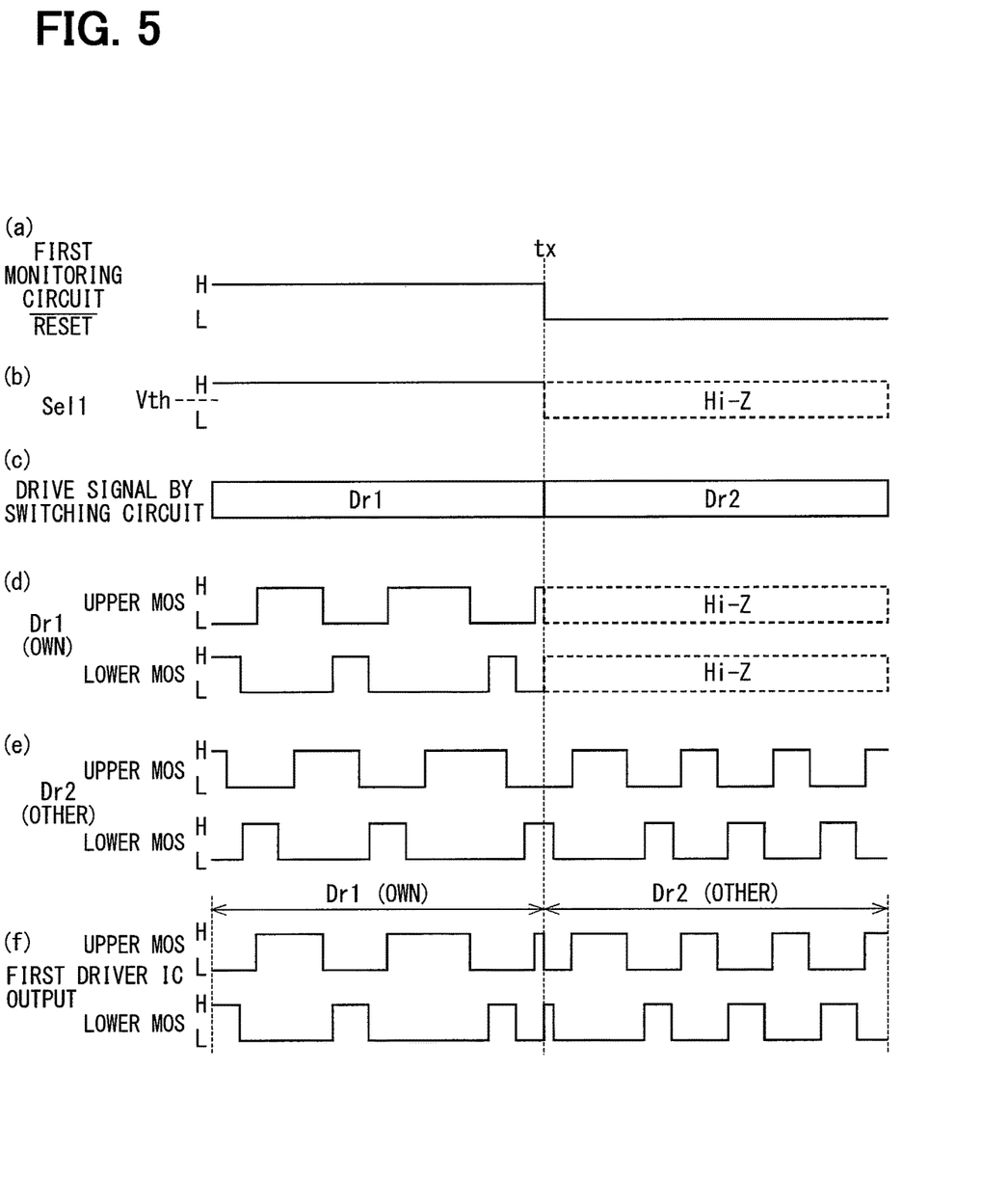
FIG. 5 is a diagram illustrating a time chart which explains an operation of the ECU in the first embodiment.

FIG. 5 (a) shows the inverted signal of the reset signal of the first monitoring circuit 31, (b) shows the first selection signal Sel1, and (c) shows the drive signal selectively outputted by the switching circuit 411 to 416 of the first switching circuit group 41. FIG. 5 (d) shows the first drive signal Dr1 generated with own by the first microcomputer 21, (e) shows the second drive signal Dr2 formed with other by the second microcomputer 22, and (f) shows the output of the first driver IC 51. The drive signals of (d), (e), and (f) show the drive signals for any one of the switching elements as a representative. In the figure, "Hi-Z" means a high impedance state.

In FIG. 5 (a), it is said that the first microcomputer 21 is "normal" in a state where the inverted signal of the reset signal is high, that is, the state in which the first monitoring circuit 31 is not outputting the reset signal. Also, it is said that the first microcomputer 21 is "abnormal" in a state where the inverted signal of the reset signal is low, that is, the state in which the first monitoring circuit 31 is outputting the reset signal.

As shown in FIGS. 5 (b) and 5 (c), when the first microcomputer 21 is normal, the first selection signal Sel1 having a voltage value exceeding the voltage threshold value Vth is outputted. Then, the first selection signal Sel1 is input, and the main switch 43 whose gate voltage exceeds the voltage threshold value Vth is turned on. The sub switch 44, to which the inverted signal of the first selection signal Sel1 is input and whose gate voltage is less than the voltage threshold Vth, is turned off. As a result, in the switching circuits 411 to 416, the first drive signal Dr1 which is the own drive signal is selected.

When the first microcomputer 21 becomes abnormal and a reset signal is input from the first monitoring circuit 31, the first microcomputer 21 stops to control, and all of the output signals to the outside, including the first selection signal Sel1, are in the high impedance state. Then, in the switching circuits 411 to 416, the main switch 43 is turned off since the signal input to the gate is in the high impedance state and the gate voltage is less than the voltage threshold Vth. Conversely, the sub switch 44 is turned on because the inverted signal input to the gate Is in the low impedance state and the gate voltage exceeds the voltage threshold Vth. As a result, in the switching circuits 411 to 416, the second drive signal Dr2 which is the other drive signal Is selected.

As shown in FIG. 5 (d), after the time tx, the first microcomputer 21 is not able to generate the first drive signal Dr1 which is the own drive signal, and the first drive signal Dr1 becomes the high impedance state. On the other hand, as shown in FIG. 5 (e), the second drive signal Dr2 generated by the second microcomputer 22 as the other drive signal for the first inverter 61 continues even after time tx.

Therefore, as shown in FIG. 5 (f), the first driver IC 51 outputs the first drive signal Dr 1 as the drive signal generated with own to the first inverter 61 until the time tx, and after the time tx, the second drive signal Dr2 which is the drive signal generated with other is outputted after the time tx.

Thus, when one of the two microcomputers, for example, the first microcomputer 21 fails, the ECU 101 continues to drive the first Inverter 61 based on the second drive signal Dr2 generated with other by the second normal microcomputer 22.

For example, it is supposed that a plurality of inverters are redundantly provided for one microcomputer, and an ECU supplies electric power to a plurality of motor winding sets corresponding to each inverter. In such ECU, when the microcomputer breaks down, it is forced to completely stop the operation.

Alternatively, it is supposed that two microcomputers and two inverters are provided, and an ECU outputs the drive signal generated by each microcomputer to the corresponding inverter. In such ECU, when any one of the microcomputers malfunctions, the operation of the Inverter of the system including the faulty microcomputer is stopped. Then, if one microcomputer out of the two systems fails, even if it is possible to continue control with the remaining one microcomputer, even if the output torque suddenly changes at the time of switching from the two system drive to the one system drive, discontinuity of the operation may be a problem. For example, in the drive system of the steering assist motor of the electric power steering apparatus, there Is a fear that the driver feels discomfort.

On the other hand, in the first embodiment, when one of the two microcomputers fails, by selecting the other drive signal in the switching circuit group of the failed system, the motor drive by the inverters 61, 62 of both systems can be appropriately continued. Therefore, particularly in the drive system of the steering assist motor of the electric power steering apparatus, sudden change of the output torque or the like can be avoided, and it is possible to prevent the driver from feeling strangeness.

As shown in FIG. 5 (f), the pulse width and the phase of the first drive signal Dr 1 and the second drive signal Dr 2 may not be identical in some cases. In this case, discontinuity occurs such that an unintended pulse is generated at the time of switching from the first drive signal Dr1 to the second drive signal Dr2.

However, in reality, even though the pulse width and the phase are somewhat different from the signal based on the current feedback control, it is possible to drive the motor 80 for steering assist. In addition, the discontinuity of the pulse at the time of switching is merely a minor one compared to the sudden change of the output torque accompanying the transition from the two systems to the one system. Therefore, in the first embodiment, a slight influence due to the difference between the first drive signal Dr1 and the second drive signal Dr2 is Ignored.

Regarding control switching at the time of abnormality of the microcomputer, the well-known technology in which two microcomputers mutually monitor abnormality has a problem that the configuration of control switching becomes complicated and time lag occurs in switching.

On the other hand, in the first embodiment, since the signal in the high impedance state is output as the selection signal when the microcomputer malfunctions, the configuration of the control switching is simplified and quick switching is possible.

Second Embodiment

The second embodiment will be described with reference to FIGS. 6 and 7.

Figure 6:
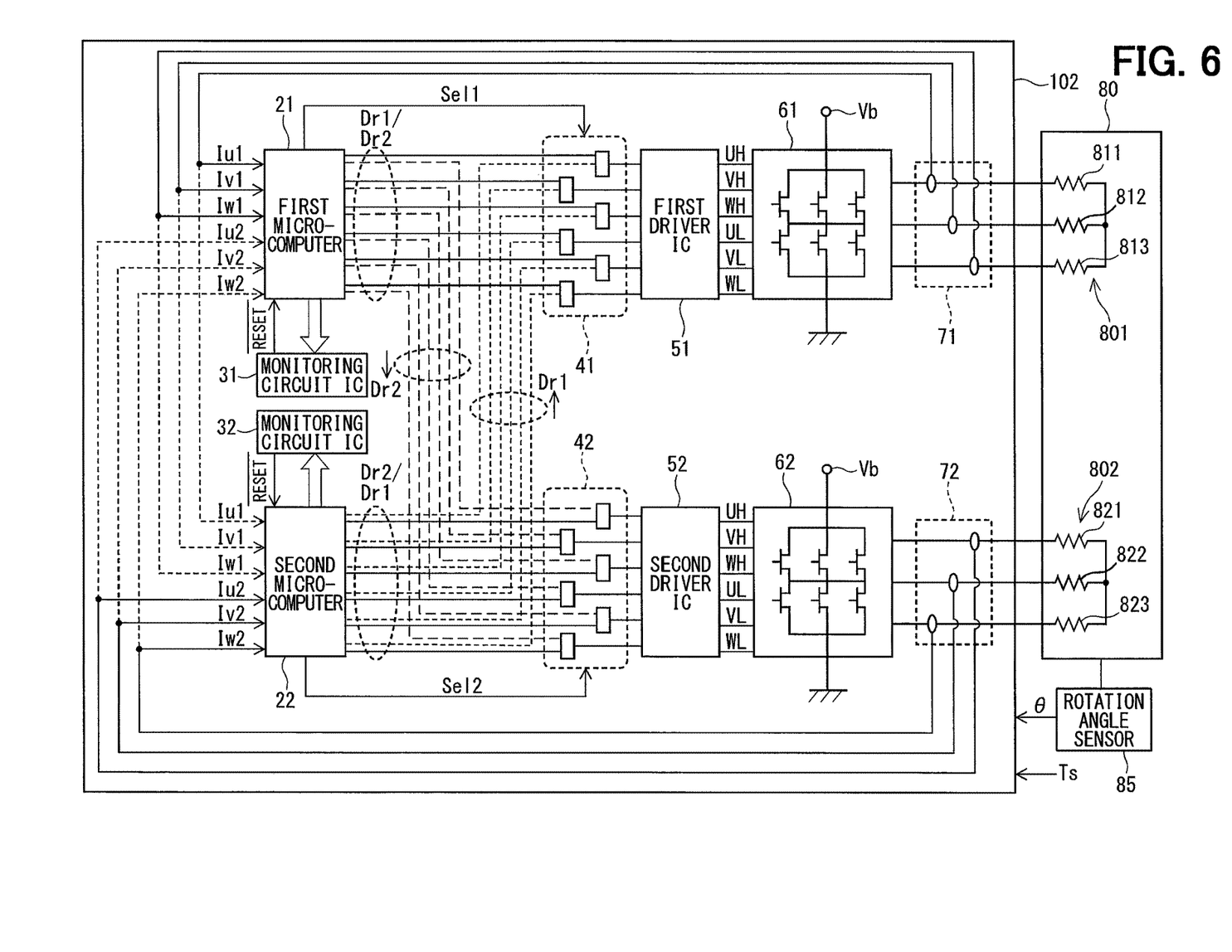
FIG. 6 is a diagram of an ECU in a second embodiment.

As shown in FIG. 6, the components of the ECU 102 of the second embodiment are the same as those of the ECU 101 of the first embodiment. However, each of the microcomputers 21, 22 not only obtains the phase current of its own system from the current sensors 71, 72 of the own system, but also obtains the phase current of the other system from the current sensors 71, 72 of the other system as indicated by the broken line.

Each of the microcomputers 21, 22 generates a drive signal for driving the inverter of the own system based on the phase current of the own system, and generates a drive signal for driving the inverter of the other system based on the phase current of the other system. That is, the first microcomputer 21 generates the second drive signal Dr2 separately from the first drive signal Dr1, and outputs it as the other drive signal to the second switching circuit group 42. The second microcomputer 22 generates the first drive signal Dr1 separately from the second drive signal Dr2 and outputs the first drive signal Dr1 to the first switching circuit group 41 as the other drive signal.

The first switching circuit group 41 receives the first drive signal Dr1 generated by the first microcomputer 21 of the own system and the first drive signal Dr1 generated with other by the second microcomputer 22 of the other system.

The second switching circuit group 42 receives the second drive signal Dr2 generated by the second microcomputer 22 of the own system and the second drive signal Dr2 generated with other by the first microcomputer 21 of the other system.

When the first microcomputer 21 is normal, the first switching circuit group 41 selects the first drive signal Dr1 generated by the first microcomputer 21, and when the first microcomputer 21 fails, the first switching circuit group 41 selects the first drive signal Dr1 generated by the second microcomputer 22, and outputs it to the first driver IC 51.

When the second microcomputer 22 is normal, the second switching circuit group 42 selects the second drive signal Dr2 generated by the second microcomputer 22, and when the second microcomputer 22 malfunctions, the second switching circuit group 42 selects the second drive signal Dr2 generated by the first microcomputer 21, and outputs it to the second driver circuit 52.

Figure 7:
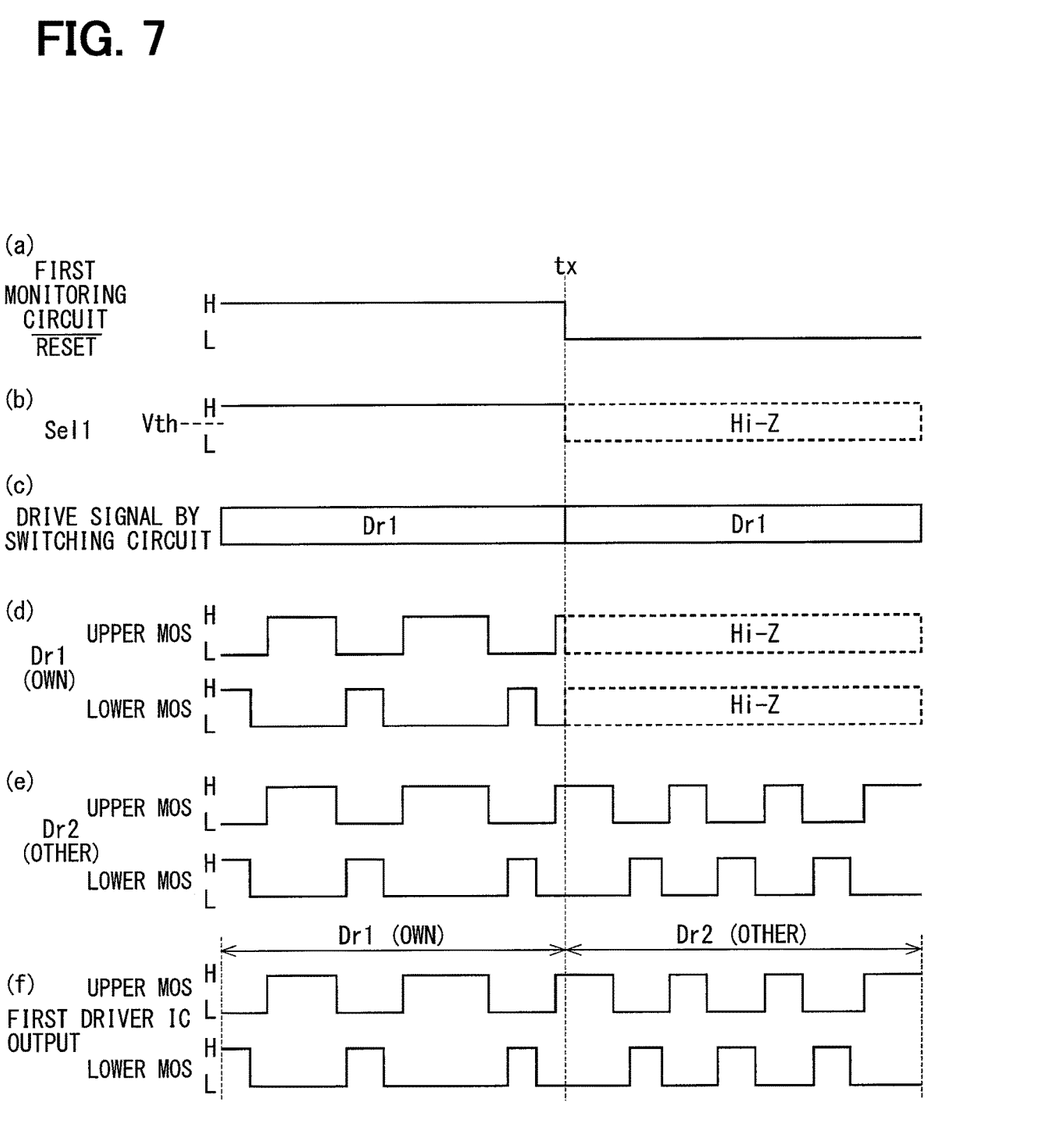
FIG. 7 is a diagram illustrating a time chart which explains an operation of the ECU in the second embodiment.

In FIGS. 7, (c), (e), and (f) are different from FIG. 5 of the first embodiment. FIG. 7 (e) shows the first drive signal Dr1 generated with other by the second microcomputer 22.

As shown in FIG. 7 (f), the first driver IC 51 outputs the first drive signal Dr1, which is the own drive signal, to the first inverter 61 until the time tx, and after the time tx, outputs the first drive signal Dr1 which Is the other drive signal.

The ECU 102 of the second embodiment has the same advantages as those of the first embodiment. In addition, since the drive signals before and after switching are the same, continuity in a strict sense can be secured. Furthermore, after switching, more appropriate control can be continued based on the signal based on the original current feedback control.

Third Embodiment

Figure 8:
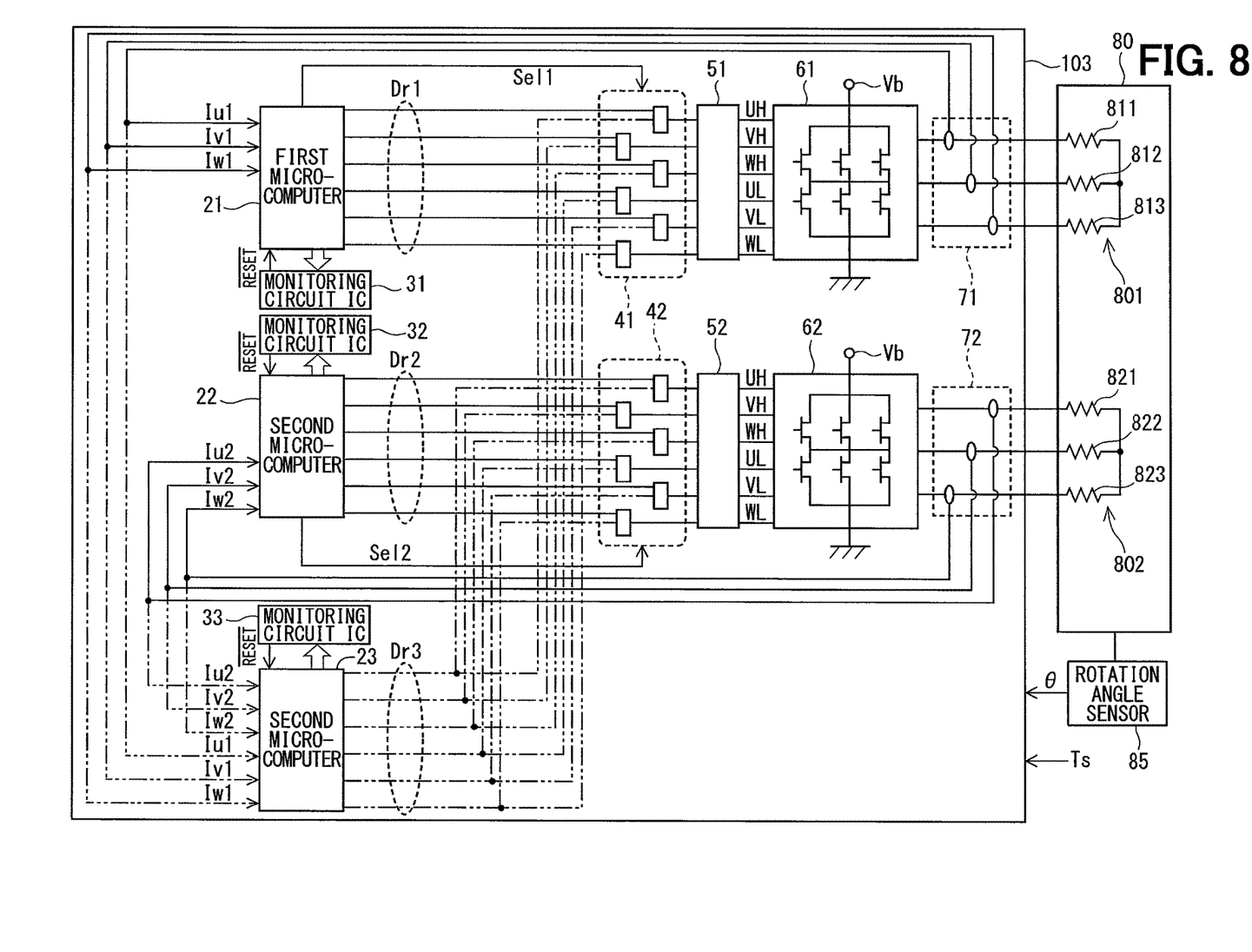
FIG. 8 is a diagram of an ECU in a third embodiment.

The third embodiment will be described with reference to FIG. 8.

In addition to the configurations of the first and second embodiments, the ECU 103 of the third embodiment further Includes a third microcomputer 23 as "backup microcomputer", and a third monitoring circuit 33 that monitors the third microcomputer 23. As described above, the third microcomputer 23 functions as the "microcomputer other than the microcomputer in the own system" with respect to the first system and the second system.

The third microcomputer 23 obtains the phase current from the current sensors 71, 72 in the respective systems, and generates the backup drive signal Dr3 that can drive both the first inverter 61 and the second inverter 62. Then, the third microcomputer 23 outputs the backup drive signal Dr3 as the other drive signal to the first switching circuit group 41 and the second switching circuit group 42. In FIG. 8, the phase current obtained by the third microcomputer 23 and the backup drive signal Dr3 are indicated by two-dot chain lines.

The backup drive signal Dr3 may be the same signal as the first drive signal Dr1 or the second drive signal Dr2, or may be an intermediate drive signal calculated based on the average value of the phase currents of both systems. In addition, the third microcomputer 23 doubly generates the first drive signal Dr1 and the second drive signal Dr2, and may output the first drive signal Dr1 to the first switch circuit group 41 and may output the second drive signal Dr2 to the second switching circuit group 42.

The first switching circuit group 41 selects the first drive signal Dr1 generated with own by the first microcomputer 21 when the first microcomputer 21 is normal, and selects the backup drive signal Dr3 generated with other by the third microcomputer 23 when the first microcomputer 21 malfunctions, and outputs it to the first driver IC 51.

When the second microcomputer 22 is normal, the second switching circuit group 42 selects the second drive signal Dr2 generated with own by the second microcomputer 22, and when the second microcomputer 22 malfunctions, the second switching circuit group 42 selects the backup drive signal Dr3 generated with other by the third microcomputer 23, and outputs it to the second driver circuit 52.

The ECU 103 of the third embodiment has the same advantages as those of the first embodiment or the second embodiment depending on the specification of the backup drive signal Dr3. Further, in the third embodiment, even when both the first microcomputer 21 and the second microcomputer 22 fall, the inverters 61, 62 of the two systems are controlled and it is possible to continue energizing the winding sets 801, 802.

Other Embodiments (A) The motor 80 to be controlled in the above embodiment is a multiple winding motor in which two pairs of winding sets 801, 802 are arranged at a common stator so as to be shifted from each other by an electrical angle of 30 degrees. In another embodiment, two or more sets of winding sets may be arranged in the same phase in the motor to be controlled. Further, the present disclosure is not limited to a configuration in which two or more pairs of windings are arranged on a common stator, but is applicable to a motor having a plurality of stators, for example, in which each winding group is separately wound and outputting torque in cooperation.

Further, the present disclosure is not limited to the AC motor, but may be applied to a DC motor with a brush as long as it is structurally feasible. In that case, H bridge circuit may be used as the "power converter".

(B) In one aspect of the present disclosure, it is merely to specify that the motor control device includes the first and second components in "at least two systems". That is, the motor control device may further include third, fourth, etc. components. For example, in a motor control device having three systems of configurations for controlling energization to three sets of winding sets, the switching circuit group of each system may receive the own drive signal by a microcomputer of the own system, and the other drive signal by the microcomputer of the next system as follows.

First switching circuit group . . . First drive signal Dr1 and second drive signal Dr2

Second switching circuit group . . . Second drive signal Dr2 and third drive signal Dr3

Third switching circuit group . . . Third drive signal Dr3 and the first drive signal Dr1

(C) The motor control device of the present disclosure is not limited to a motor for an electric power steering device, but may be applied to a motor for any other purpose.

Although the embodiment of the present disclosure has been exemplified above, the embodiment is not limited to the above-described embodiment. The technical Idea of the present disclosure can be embodied as various embodiments without departing from the gist thereof.

The invention claimed is:

1. A motor control device for controlling a drive of a motor having a plurality of winding sets, in which phase currents having phases shifted by predetermined degrees are energized, and which are coaxially arranged, the motor control device comprising:
    a group of components configured to control energization to a specific winding set, wherein a unit of the group of components is defined as a system, and with respect to a certain component, a system including the certain component is defined as an own system, and the other system not including the certain component is defined as an other system;
    in at least two of a plurality of systems,
    a first power converter and a second power converter configured to supply power to corresponding winding sets based on an operation of a plurality of switching elements;
    a first microcomputer and a second microcomputer configured to generate a drive signal which drives the power converter of at least the own system, when the first microcomputer and the second microcomputer are normal;
    a first monitoring circuit and a second monitoring circuit configured to individually monitor a fault of the first microcomputer and the second microcomputer; and
    a first switching circuit group and a second switching circuit group respectively provided between the first and second microcomputers and the first and second power converters, the first switching circuit group and the second switching circuit group respectively including a plurality of switching circuits corresponding to the plurality of switching elements of the power converters, and receiving an own drive signal generated by the first and second microcomputers in the own system and an other drive signal generated by a microcomputer other than the first and second microcomputers of the own system so as to select the own drive signal or the other drive signal according to a selection signal from the first and second microcomputers of the own system, and the first switching circuit group and the second switching circuit group configured to output the selected drive signal to the power converter of the own system, wherein
    the first microcomputer and the second microcomputer are configured to
    output commonly the own drive signal which is output to the switching circuit group in the own system, as the other drive signal to the switching circuit group in the other system, and
    output selection signals to the switching circuit groups of the own system so as to select the own drive signal when the first and second microcomputers operate normally, and output the selection signals so as to select other drive signals when the monitoring circuit of the own system detects a fault of any one of the first and second microcomputers,
    the drive signal changes discontinuously based on the phases shifted by the predetermined degrees, when switching from the own drive signal to the other system,
    the plurality of switching circuits comprising the first switching circuit group and the second switching circuit group include
    a main switch that is turned on when a signal exceeding a predetermined voltage threshold value is input as the selection signal and operates so that the own drive signal is outputted;
    a sub switch which is turned on when a signal of a high impedance state, which is lower than the predetermined voltage threshold value, is inputted as the selection signal and operates so that the other drive signal is outputted, and
    the first microcomputer and the second microcomputer output
    the selection signal so that the main switch is turned on, when the first and second microcomputers are normal, and
    the selection signal so that the sub switch is turned on, when the fault of any one of the first and second microcomputers is detected by the monitoring circuit of the own system.

2. The motor control device according to claim 1, wherein the motor control device is applied to an electric power steering apparatus in a vehicle so as to control driving of a steering assist motor.

* * * * *